May 28, 1935.                    H. FREEMAN                    2,002,496
                        METHOD OF ROASTING SULPHIDE ORES
                              Filed March 25, 1932
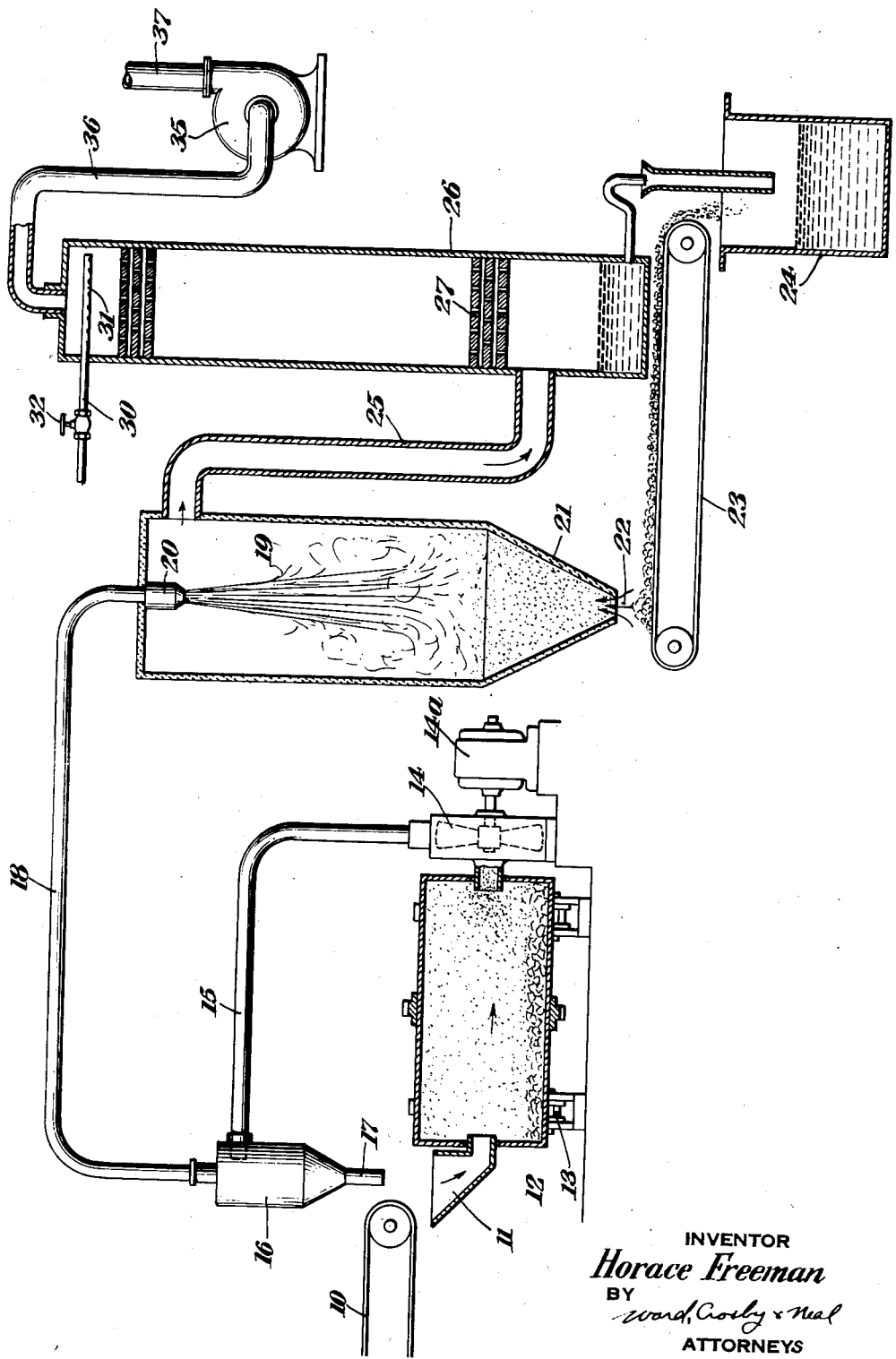
INVENTOR
Horace Freeman
BY
Ward, Crosby & Neal
ATTORNEYS Patented May 28, 1935

2,002,496

UNITED STATES PATENT OFFICE 2,002,496

METHOD OF ROASTING SULPHIDE ORE

Horace Freeman, Montreal, Quebec, Canada, assignor to Nichols Engineering & Research Corporation of Canada, Limited, a corporation of Canada Application March 25, 1932, Serial No. 601,138

16 Claims. (Cl. 75—60)

This invention relates to the roasting of sulphide ores or concentrates and, more particularly, to a method and apparatus for roasting said substances in suspension in an air or gas current for effecting substantially complete removal of the sulphur therefrom and the formation of sulphur dioxide.

In systems of this type, the ore particles are blown into a combustion chamber and caused to burn rapidly therein, whereby oxidation of the ore takes place with the consequent formation of sulphur dioxide and metallic oxide. In this process a substantial amount of heat is developed by the oxidation of the ore, which raises the ore particles to the temperature of fusion. The fusion of the particles is often an objection, particularly when it is desired subsequently to treat the metallic oxides for the extraction of the metals which they contain. For instance, when this process is used for roasting sulphide ores of zinc, it is often found that fusion of the particles of zinc oxide, particularly when these contain a certain quantity of iron oxide, renders the zinc oxide soluble in sulphuric acid with difficulty and incompletely, and when the sulphide ore used in this combustion process is a sulphide of iron containing copper, it has been found that the fusion of the particles of iron oxide renders the copper content largely insoluble in sulphuric acid. Also, if the ore being treated is a sulphide of iron containing gold, the fusion of the iron oxide particles renders the gold insoluble in such solvents as cyanide of sodium. In carrying out the combustion of sulphide ore particles in suspension, I have found that the fusion of the particles involves a temperature on the surface of the particle considerably above the average temperature within the combustion chamber. In endeavoring to prevent fusion of the particles by using an abnormally low temperature in the combustion chamber, one encounters the difficulty of operating within a temperature range at which sulphur trioxide may be formed.

It is an object of the present invention to overcome the above difficulties and to provide a system in which fusion of the particles is avoided and at the same time formation of substantial quantities of sulphur trioxide is also avoided, while preferably maintaining a relatively high temperature in the combustion chamber. Another object of the invention is to obviate the formation of ferrates of zinc when treating sulphide ores containing both zinc and iron at high temperatures. A further object is to provide a simple and convenient process which may be efficiently carried out for the above purpose.

I have found that when finely divided particles are burned in suspension in an air current, the rate at which heat is developed is dependent upon the size of the particles and the rapidity with which oxidation is permitted to take place. I have also found that the temperature to which the particles are raised depends upon the ratio of the surface area of the particles to the mass of the individual particle. As this ratio is increased, the temperature of the resultant particle is decreased, due to the increase in heat radiation from the surface thereof. I have accordingly devised a system in which the particles are treated in such a fine state of sub-division that the heat developed by the oxidation of the particles is rapidly dissipated from the surface of the particles and does not raise the temperature of the particles above the fusion point. At the same time, the rate of oxidation of the particles is sufficiently rapid, due to the large area which is exposed to the oxidizing agent, to raise the temperature of the sulphur dioxide within the combustion chamber to a range above that in which sulphur trioxide is formed in any substantial quantities.

In order to prevent the formation of sulphur trioxide as the gases become cooled, I effect a sudden cooling of the gases from the above mentioned high temperature to a temperature range below that at which sulphur trioxide is formed. The process accordingly is so carried out that the residual particles are removed in unfused condition and the sulphur dioxide remains substantially free from sulphur trioxide.

I have found that for certain materials such, for example, as sulphide ores of zinc, containing iron, the particles should be in a state of sub-division between 250 mesh and colloidal and that within the above limits the fine particles produce a gas at the desired high temperature and themselves remain at a temperature below the point of fusion. The process is particularly applicable to sulphide ores of zinc containing iron, but may also be applied to other ores such as, for example, sulphide ores of iron containing copper and, or, gold, although the details of operation will be varied to suit the requirements of the particular ore under treatment.

Further and more specific objects, features and advantages of the invention will more clearly appear from the detailed description given below, taken in connection with the accompanying drawing, which discloses by way of example one embodiment of the invention.

The invention consists in such novel features, arrangements and combinations of parts as may be shown and described in connection with the arrangements of apparatus herein disclosed, by way of example only and as illustrative of a preferred embodiment, together with such novel methods and steps of processes as may also be described herein.

Referring to the drawing more in detail, the apparatus is shown as comprising a traveling conveyor 10 which is adapted to convey the ore to be treated to a hopper 11 which discharges into a grinding mill such as a ball grinder 12. Said grinding mill is mounted on rollers 13 or is adapted to be rotated in any well-known manner to produce the necessary abrading action.

Air may be drawn through the mill 12 by means of a fan or blower 14 which is operated by a suitable source of power such as an electric motor 14a. Such air carries quantities of the finely divided material in suspension from the mill 12 through a pipe 15 which enters a classifier 16. This classifier is so arranged that the larger particles are removed from the air stream and are discharged through a spout 17 into the hopper 11 for retreatment in the grinding mill. The remaining particles, of the desired fineness in suspension in the air stream, are carried through a pipe 18 to a combustion chamber 19. Said combustion chamber is formed of suitable heat resisting material and is provided with a nozzle 20, also formed of heat resisting material. The pipe 18 is connected to this nozzle. The lower part of the combustion chamber 19 includes a hopper 21 which is adapted to receive these particles and to discharge the same through a spout 22 onto a traveling conveyor 23. Said conveyor is spaced at a sufficient distance below the end of the spout 22 to permit air currents to be drawn therein by the action of suitable suction means to be described. The traveling conveyor 23 discharges the ore into a leaching tank or basin 24.

A pipe 25 interconnects the top of the combustion chamber 19 with a washing tower 26 which may be provided with open tile 27 or other suitable means to effect a substantial area of contact between the ascending gases and descending liquid. A washing liquid may be applied through a pipe 30 terminating in a spray nozzle 31 and is caused to flow downwardly over the tile 27. The flow of liquid may be controlled by a valve 32 in the pipe 30. The liquid which gathers at the bottom of the tower may be withdrawn through a spout 33 and passed into the leaching basin 24. A fan 35 may be associated with a pipe 36 for withdrawing the gases from the top of the tower 26 and discharging the same through a pipe 37 to a suitable utilization apparatus.

In carrying on the process by means of the above described apparatus, the ore is treated in the grinding mill 12 until it is comminuted to the desired degree of fineness which I have found to lie in the range of 250 mesh to colloidal. The classifier 16 is so designed as to remove all particles from the air stream which are above this range in size. Only so much air is drawn through the grinding mill as is necessary to maintain the particles in suspension and to carry them through the pipe system above described into the combustion chamber 19.

The combustion chamber, prior to the start of the process, is preheated in any well-known manner. The ore and air are then introduced through the pipe 18 and sufficient extra air to complete the oxidation of the suspended particles is drawn upwardly through said chamber by means of the blower 35. This air may or may not be preheated. As the particles enter the preheated chamber and contact with the upwardly moving air stream, they are rapidly oxidized and the heat of reaction raises the temperature in the chamber to a point above the formation temperature of sulphur trioxide. By reason of the extremely fine subdivision of the particles, the reaction takes place with great rapidity and a substantial amount of heat is thus developed and given up to the gases containing sulphur dioxide. The extremely large ratio of surface area to mass of the particles causes the heat of oxidation to be rapidly dissipated from the surface of the particles and prevents the temperature of the particles themselves from being raised above the fusion point thereof. Most of the particles, in falling through the rising air stream within the combustion chamber, are finally cooled and are discharged onto the traveling conveyor 23 in the form of a fine powder.

The highly heated sulphur dioxide gases, carrying some of the oxidized particles, are led through the pipe 25 into the washing tower 26 where they come in contact with the washing liquid and are quickly cooled to a temperature below the temperature of formation of sulphur trioxide, at the same time giving up their heat to the washing liquid. For this purpose, it is preferable to utilize the liquid which is to be employed in leaching the residue and thereby to use the heat of the sulphur dioxide gases for preheating said liquid. Furthermore, the liquid in flowing through the washing tower removes any solid particles which may be carried over into said tower with the sulphur dioxide gases and discharges said particles into the leaching tank together with the residue falling from the combustion chamber which is to be treated.

In case the apparatus is used for the treatment of zinc ores, the liquid used in the washing tower may comprise the spent electrolyte taken from the electrolytic cells used in the purification of the zinc. This electrolyte contains dilute sulphuric acid. Dilute sulphuric acid obtained from other sources may also be used in the washing tower and such liquid serves to wash the gases free from zinc oxide and other suspended particles, and at the same time the liquid is heated before it passes to the leaching tank. In fact, the washing liquid, although introduced into the washing tower at a low temperature, in order to cause rapid cooling of the gases, is finally heated to such a temperature that as it leaves the washing tower, it contains substantially no dissolved sulphur dioxide.

By reason of the comparatively pure state of the sulphur dioxide which is removed from the washing tower, the gas is particularly adapted to various commercial processes, as for example, to the manufacture of sulphuric acid or to the formation of sulphurous acid for use in paper plants. Furthermore, the residue is in the form of an extremely fine powder, which has at no time during the process been raised to the fusion temperature and which is therefore best suited for the subsequent leaching operation.

In the above described process, the oxidizing agent has been referred to as air. However, other oxidizing gases may be employed, or if desired, a nonoxidizing gas could be passed upwardly through the combustion chamber and the oxidizing agent may be introduced by other means. Furthermore, the relationship of the air which is utilized for introducing the particles into the combustion chamber and the air which is subsequently introduced from the bottom of said chamber may be varied to suit the particular conditions. The operation may be carried out without substantial excess of air, due to the large surface areas available for the reaction.

The washing tower has been illustrated as a preferred means for rapidly cooling the gas and at the same time utilizing the heat thereof in an efficient manner. However, the gases may be cooled by other means.

While the invention has been described in detail with respect to particular preferred examples, it will be understood by those skilled in the art after understanding the invention that various changes and further modifications may be made without departing from the spirit and scope of the invention, and it is intended therefore in the appended claims to cover all such changes and modifications.

What is claimed as new and desired to be secured by Letters Patent of the United States is:

1. The process of treating sulphide ores or concentrates which comprises reacting said ores and concentrates, in a state of subdivision between substantially 250 mesh and colloidal, in suspenpension in a fluid medium with an oxidizing agent under conditions favorable to the formation of sulphur dioxide, the large ratio of surface area to the mass of the particles permitting a rapid oxidation of the sulphur, maintaining the area of roasting and the sulphur dioxide gases while in the chamber above the temperature of formation of sulphur trioxide, and permitting the heat of the reaction to radiate from the particles whereby fusion of the particles themselves is prevented.

2. The process of treating sulphide ores of zinc containing iron which comprises dividing said ores to a fineness between substantially 250 mesh and colloidal, introducing the particles thus produced into a combustion chamber, maintaining said particles in suspension in said chamber while contacting the same with an oxidizing gas whereby the sulphur is oxidized to sulphur dioxide, the fine subdivision of the particles favoring the maintenance of the sulphur dioxide at high temperature and the particles themselves at a temperature below the fusion point thereof, removing the sulphur dioxide gases from said chamber at the top thereof, and separately removing the particles from said chamber as a fine powder suitable for treatment by leaching.

3. The process of treating sulphide ores of zinc containing iron which comprises finely dividing said ores to a degree of fineness between substantially 250 mesh and colloidal, introducing the fine particles into a combustion chamber, passing a countercurrent of oxidizing gas through said chamber whereby said particles are maintained in suspension while the sulphur is oxidized to sulphur dioxide, the fine subdivision favoring the production of sulphur dioxide gases at a temperature above the temperature of substantial formation of sulphur trioxide and serving to radiate the heat of reaction from the particles and to prevent the said particles from fusing, removing the gases from contact with the particles and rapidly cooling said gases to a temperature below the temperature of substantial formation of sulphur trioxide.

4. The process of treating sulphide ores or concentrates which comprises reacting said substances in a finely divided condition with an oxidizing agent capable of uniting with the sulphur and forming sulphur dioxide, the state of subdivision of said particles being such that the sulphur dioxide is produced at high temperature and the heat is radiated from said ore particles whereby said particles are maintained below fusion temperature thereof, removing said sulphur dioxide at said high temperature and contacting said sulphur dioxide with a leaching liquid whereby said sulphur dioxide is rapidly cooled to a temperature below the temperature of formation of sulphur trioxide and said leaching liquid is heated, and removing the fine particles separately from the sulphur dioxide from said combustion chamber and applying said leaching liquid thereto.

5. The process of treating zinc sulphide ores with the recovery of sulphur dioxide, which comprises roasting the ore when in a finely divided condition with an oxidizing agent, withdrawing the resulting sulphur dioxide as formed into a washing tower for quickly cooling the same, passing the ore to a leaching tank, utilizing a washing liquid in said tower comprising spent electrolyte taken from cells used in the manufacture of electrolytic zinc, and further utilizing such liquid after it is heated in said washing tower, as the leaching liquid in said leaching tank.

6. Process of treating finely divided zinc sulphide ore, concentrates or the like zinc sulphide materials, which comprises grinding the material, passing it into a classifier, and thence into a roasting chamber by a slight draft of air substantially no more than sufficient to maintain and carry in suspension such of the particles as are ground to a state of subdivision approaching colloidal fineness, roasting the material while in suspension in said chamber whereby the sulphur is oxidized to sulphur dioxide and the zinc is oxidized, removing the oxidized particles from the area of roasting by allowing the same to settle by gravity against an upwardly flowing stream of relatively cooler oxidizing gas, and removing the gaseous products of combustion by conducting the same upwardly from the area of roasting, said particles in the roasting chamber being of a sufficiently fine subdivision to present a surface area capable of dissipating the heat of reaction without raising the temperature of the particles themselves sufficiently to cause fusion thereof at any stage of the process.

7. Process of treating finely divided zinc sulphide ore, concentrates or the like zinc sulphide materials, which comprises grinding the material, passing it into a classifier, and thence into a roasting chamber by a slight draft of air substantially no more than sufficient to maintain and carry in suspension the finely ground particles, roasting the material while in suspension in said chamber whereby the sulphur is oxidized to sulphur dioxide and the zinc is oxidized, removing the oxidized particles from the area of roasting by allowing the same to settle by gravity against an upwardly flowing stream of relatively cooler oxidizing gas, and removing the gaseous products of combustion by conducting the same upwardly from the area of roasting, said particles in the roasting chamber being of a sufficiently fine subdivision to present a surface area capable of dissipating the heat of reaction without raising the temperature of the particles themselves sufficiently to cause fusion thereof at any stage of the process.

8. Process of treating finely divided zinc sulphide ore, concentrates or the like zinc sulphide materials, which comprises grinding the material, passing it into a classifier, and thence into a roasting chamber by a slight draft of air substantially no more than sufficient to maintain and carry in suspension the finely ground particles, roasting the material while in suspension in said chamber whereby the sulphur is oxidized to sulphur dioxide and the zinc is oxidized, removing the oxidized particles from the area of roasting by allowing the same to settle by gravity against an upwardly flowing stream of relatively cooler oxidizing gas, removing the gaseous products of combustion by conducting the same upwardly from the area of roasting, said particles in the roasting chamber being of a sufficiently fine subdivision to present a surface area capable of dissipating the heat of reaction without raising the temperature of the particles themselves sufficiently to cause fusion thereof at any stage of the process, and maintaining the area of roasting and the sulphur dioxide gases while in the chamber above the temperature of formation of sulphur trioxide.

9. Process of oxidizing metal sulphides, which comprises reducing the same to a state of subdivision approaching colloidal fineness, conveying the fine particles by a gaseous medium into the upper part of a roasting chamber, roasting the particles to oxidize substantially all of the metal and sulphur content thereof while the same are in suspension in said chamber by introducing oxidizing gas, at least a substantial proportion of which is introduced into the chamber independently of the sulphides, withdrawing the oxidized metal particles from the area of roasting by allowing the same to settle by gravity countercurrent to a relatively cooler stream of gas rising into the roasting area, and removing in an upward direction the gaseous products from the roasting area, the fine particles having a ratio of surface area to mass such that the heat of reaction is radiated from the surfaces thereof at a rate preventing the particles from becoming fused.

10. Process of producing sulphur dioxide, which comprises roasting in suspension finely divided zinc sulphide ores or concentrates, removing the sulphur dioxide gases from the area of roasting independently of the removal of the larger part of the roasted particles, passing said gases from the roasting area while still at a high temperature through a wash tower, and utilizing a cooling liquid in the wash tower comprising the spent electrolyte taken from the electrolytic cells used in the purification of the zinc.

11. Process of producing sulphur dioxide which comprises roasting in suspension finely divided zinc sulphide ores or concentrates, removing the sulphur dioxide gases from the area of roasting independently of the removal of the larger part of the roasted particles, passing said gases from the roasting area while still at a high temperature through a wash tower, and utilizing a cooling liquid in the wash tower comprising the spent electrolyte taken from the electrolytic cells used in the purification of the zinc, said liquid as it finally leaves the wash tower being heated by the gases to a temperature such that it contains substantially no dissolved sulphur dioxide.

12. Process of producing sulphur dioxide which comprises roasting in suspension finely divided metal sulphide ores or concentrates, removing the sulphur dioxide gases from the area of roasting independently of the removal of the larger part of the roasted particles, passing said gases from the roasting area while still at a high temperature into a wash tower to quickly cool the gases, and utilizing a cooling liquid in the wash tower comprising the spent electrolyte taken from the electrolytic cells used in the purification of the metal, said liquid as it finally leaves the wash tower being heated by the gases to a temperature such that it contains substantially no dissolved sulphur dioxide.

13. Process of treating sulphide ores or concentrates to produce sulphur dioxide and metal oxides, which comprises roasting the material in finely divided form in suspension, removing the sulphur dioxide gases from the area of roasting independently of the removal of the larger part of the roasted particles, passing the gases from the roast through a wash tower whereby said gases are quickly cooled, utilizing dilute sulphuric acid as the wash liquid in said tower, the quantity of such liquid being such that as it leaves the tower it will be heated sufficiently so that it contains substantially no dissolved sulphur dioxide, and utilizing said acid from the tower while thus preheated for leaching the roasted particles.

14. Process of treating zinc sulphide ores or concentrates which comprises roasting the same in a state of fine subdivision in suspension without fusion of the particles, removing the sulphur dioxide gases from the area of roasting independently of the removal of the larger part of the roasted particles, utilizing the heat of said gases to preheat a leach liquid, and leaching the unfused roasted particles in said preheated liquid.

15. The process of treating finely divided zinc sulphide ore, concentrates or the like zinc sulphide material, which comprises passing said material in finely divided form into a chamber for downward passage therethrough under the influence of gravity, passing a stream of oxidizing gas through said chamber countercurrent to the descending material, maintaining the area of roasting and the sulphur dioxide gases while in the chamber above the temperature of formation of sulphur trioxide, and passing the oxidized particles of material from said chamber in powder-like form.

16. The process of treating finely divided zinc sulphide ore, concentrates or the like zinc sulphide material, which comprises passing said material in finely divided form into a chamber for downward passage therethrough under the influence of gravity, passing a stream of oxidizing gas through said chamber countercurrent to the descending material, maintaining the area of roasting and the sulphur dioxide gases while in the chamber above the temperature of formation of sulphur trioxide, and passing the resultant high temperature sulphur dioxide gases through a washing zone to quickly cool them below the temperature of formation of sulphur trioxide.

HORACE FREEMAN.